H. H. CUMMINGS.
BOOT TREEING MACHINE.
APPLICATION FILED JAN. 22, 1906.
945,306.
Patented Jan. 4, 1910.
3 SHEETS—SHEET 1.
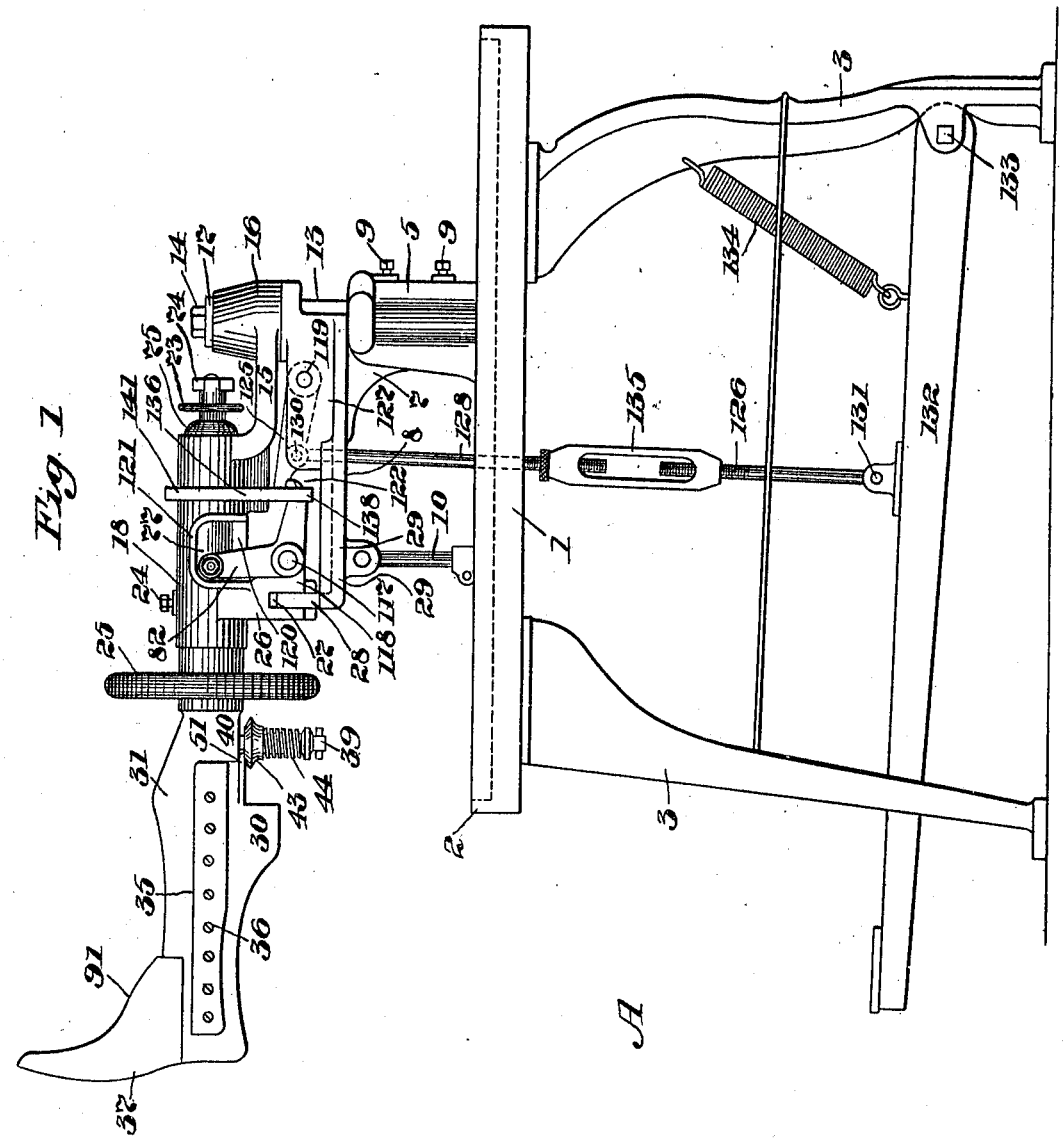
Witnesses:
Horace H. Crossman
Robert H. Kammler
Inventor:
Henry H. Cummings
by Emery, Booth & Powell
Attys.

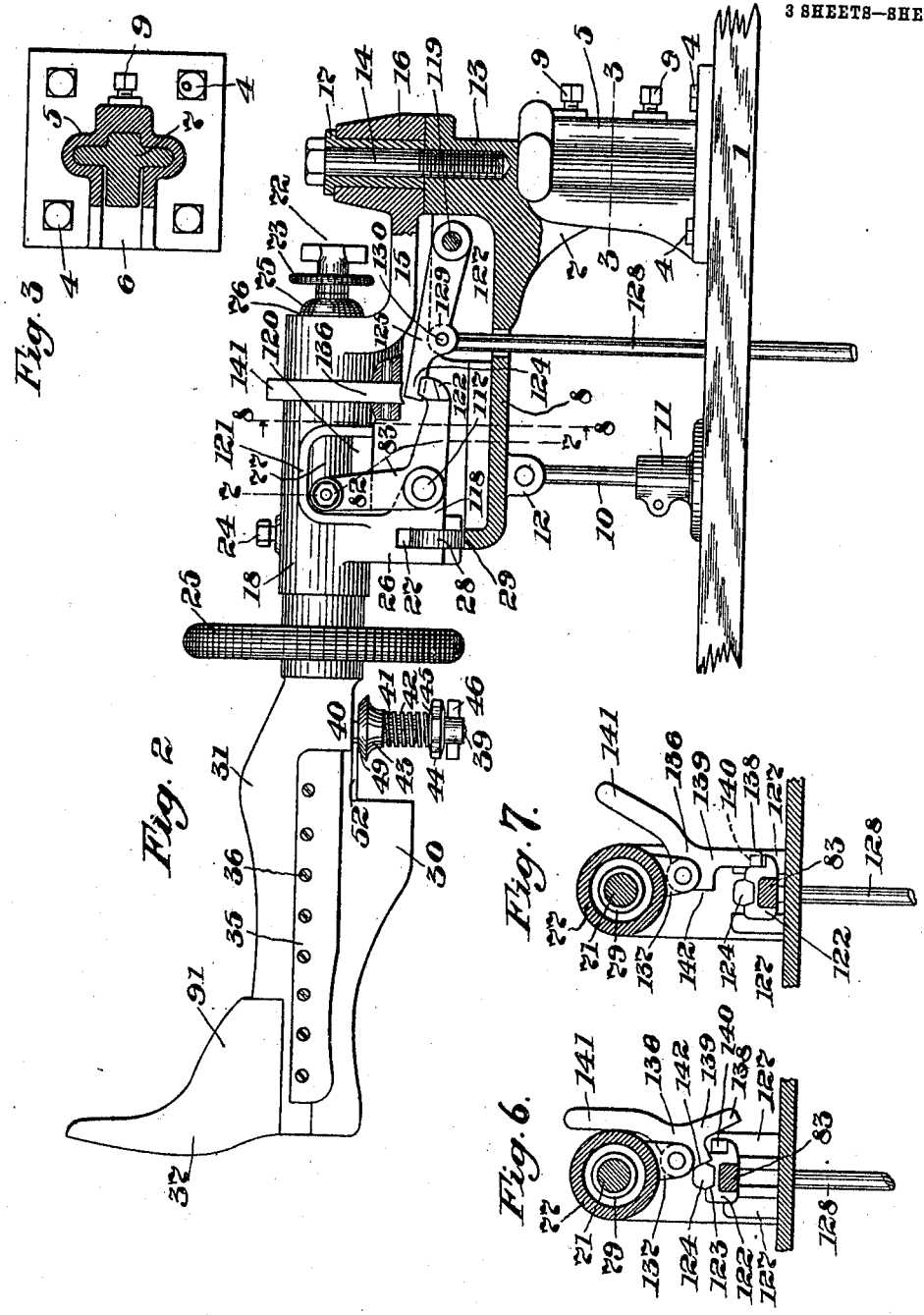

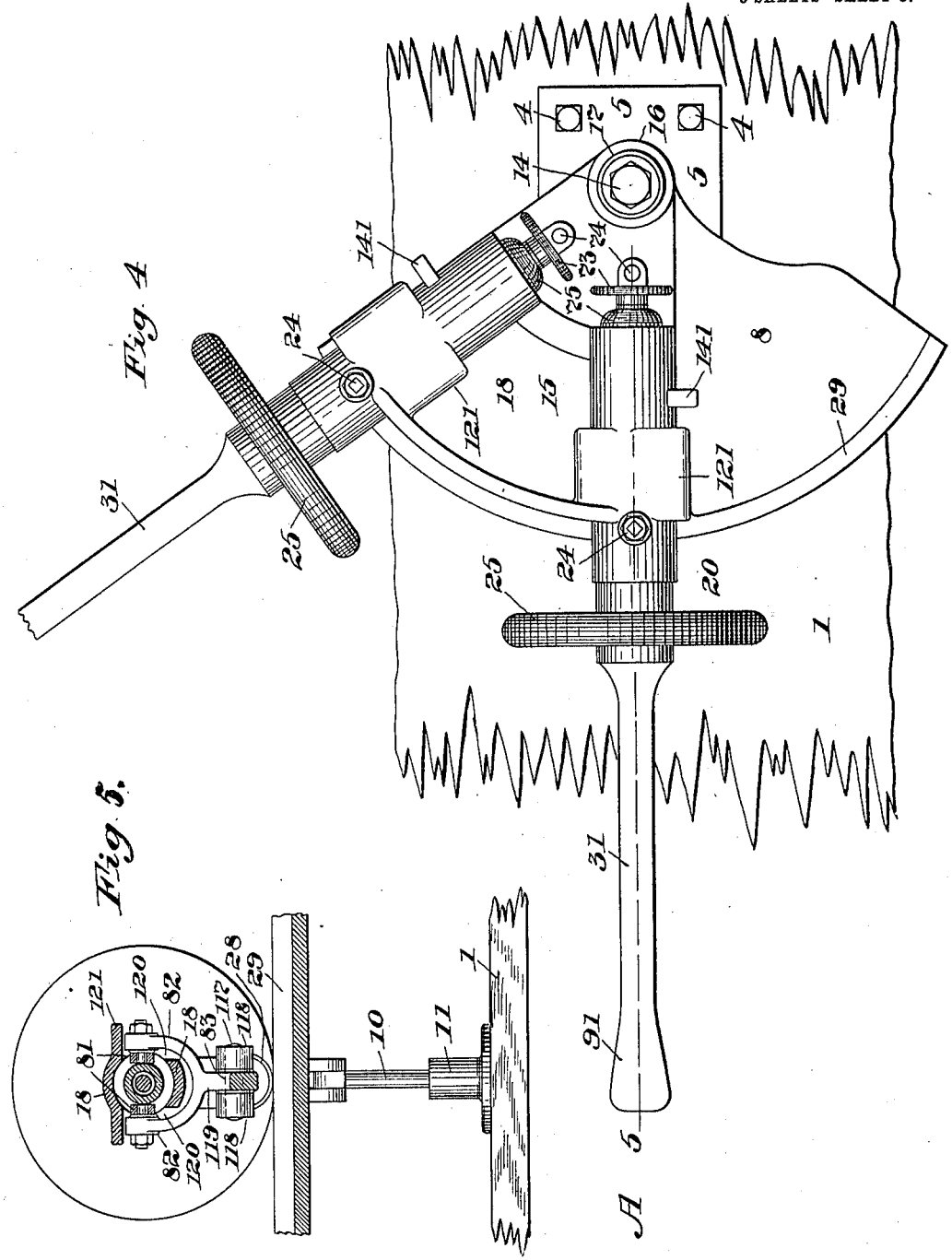

UNITED STATES PATENT OFFICE.

HENRY H. CUMMINGS, OF NEWTON, MASSACHUSETTS, ASSIGNOR, BY MESNE ASSIGNMENTS, TO MANUFACTURERS MACHINE COMPANY, OF MONTCLAIR, NEW JERSEY, A CORPORATION OF NEW JERSEY.

BOOT-TREEING MACHINE.

945,306.      Specification of Letters Patent.      Patented Jan. 4, 1910.

Application filed January 22, 1906. Serial No. 297,129.

*To all whom it may concern:*

Be it known that I, HENRY H. CUMMINGS, a citizen of the United States, residing at Newton, in the county of Middlesex and State of Massachusetts, have invented an Improvement in Boot-Treeing Machines, of which the following description, in connection with the accompanying drawings, is a specification, like letters on the drawings representing like parts.

My invention relates to treeing machines for boots and shoes and will be best understood and appreciated by reference to the following description, when taken in connection with the accompanying drawings, of a machine illustrating one embodiment of my invention, while its scope will be more particularly pointed out in the appended claims.

Referring to the drawings, Figure 1 is an elevation of the right side of a machine selected for the purpose of illustration; Fig. 2, a similar enlarged and partially sectional view to show the tree and its actuating mechanism, the base of the bench being omitted; Fig. 3, a longitudinal section of the standard taken on the line 3—3, Fig. 2; Fig. 4, a plan view of the machine to show the arrangement of twin trees in the tree-carrying frame, the top of the bench being shown with parts broken away; Fig. 5, cross sectional detail on line 7—7, Fig. 2, to show the connection of the bell crank yoke with the tree expanding mechanism; Fig. 6, a vertical cross sectional detail from the front on line 8—8, Fig. 2, to show the coöperating ends of the bell crank and actuating levers in their normal position with the tree unexpanded and the gravity dog mounted to coöperate therewith; Fig. 7, a similar view showing the bell crank lever depressed by the end of the actuating lever and held down by the gravity dog to maintain the tree expanded.

As herein shown (see Figs. 1 and 2), my machine comprises a tree bench supporting horizontally a pair of twin boot trees, preferably rights and lefts, which are of the expansible type. Said bench has a top 1, with a vertical edge flange 2, and is supported by suitable legs 3, said top having secured thereto, as by bolts 4, (see Fig. 3) a standard 5, formed with a central T or cross-shaped vertical groove 6, to receive a ribbed supporting arm or lug 7 for a segmental bearing plate 8. In order that said bearing plate may be carried at a height adapted to the needs of the operator, the arm 7 is slidably mounted within the groove 6 of the standard and is adjustably secured therein by means of bolts 9, tapped through the standard. The outer end of said plate rests upon an auxiliary support 10, vertically adjustable in a socket 11, secured to the bench top and pivotally connected at its upper end to ears 12, on the bearing plate. At its rear edge said bearing plate 8, is provided with an upwardly projecting boss 13, into which is tapped the threaded end of a vertical stud 14 (Fig. 2) alined with the vertical groove in the standard.

Swingingly mounted upon the stud 14, is a sector-shaped tree-carrying frame 15, provided at its apex with a boss 16, vertically drilled to receive a brass bushing 17, through which said stud is extended, to pivot the tree-carrying frame thereto and to enable it to be oscillated to either side of a central position (see Fig. 4). This tree-carrying frame is provided with two radiating tubular bearings 18, to receive the hollow cylindrical ends or tubular trunnions of the boot trees.

To facilitate rotating the tree, it is provided with a suitable hand wheel 25. As will be readily seen, this arrangement of twin trees not only enables more than one operator to do work at the same bench, but it also permits an operator to swing one boot when dressed and cleaned, to one side to dry, while he is applying a new boot to the other tree.

To facilitate swinging the tree-carrying frame back and forth on the bearing plate, an arm or bracket 26 (Fig. 2) depending from the under side of said tree bearing 18 is provided with a vertical transverse slot 27, in which is mounted a roller 28 (Fig. 5) adapted to run upon a circumferential upturned edge or flange 29 (Figs. 2 and 5) formed upon the front edge of said segmental bearing plate. This arrangement also provides suitable means for supporting the tree frame outwardly in any position, to prevent strain upon the stud 14, due to the weight of the tree or to the treeing operation. The boot trees carried by the tree-carrying frame are each provided with an expansible leg and a separable and expansible foot. The leg comprises a back 30 and a fore-part 31.

To cover the space between the leg parts when separated and also to furnish a guide for the back part in its movements, said fore-part 31, preferably of metal, is provided on its sides with metallic strips 35 (Fig. 2) secured thereto by screws 36, to receive between them the closely fitting back 30, which may be of any desired size or shape. This back is removably and pivotally connected to the fore-part or leg of the tree by connecting mechanism comprising a pin 39 screwed into the back 40 of the fore-part and carrying a loose collar 41, yieldingly forced toward the tree leg by a coil spring 42, which surrounds said pin and is interposed between the enlarged head 43 of said collar and a similar head 44 of a collar 45 mounted upon the lower end of said pin. This lower collar is adjustably held on said pin by means of the adjusting nut 46. By turning the adjusting nut the lower collar may be elevated or depressed to vary the tension of the spring 42 and therefore the pressure of the upper collar against the tree.

To secure the back to the fore-part, the head of said upper collar is provided with a beveled edge 49, and its inner end face with a circular depression or recess to receive the hooked end of a plate 52 secured to the end of the back 30. This hook prevents the back from moving outwardly, while the plate is engaged by the edge of the collar to hold it elevated under the tension of the coil spring 42, which is stiff enough to more than overcome the weight of said back, the hook and collar acting also as a pivotal connection between the back and said fore-part. In applying the back to the tree, its upper edge is placed in the groove presented between the fore-part strips 35, and is then pushed in until the hooked end 51 of said plate, in engaging the beveled head 43 of the collar, depresses the latter against the action of its spring and enters the recess, retaining the shoulder of said hook in locked engagement with the edge of said recess. This mode of attaching the back securely holds it against accidental detachment and allows it to be readily removed and replaced by depressing said collar 41 and spring 42, the hooked end 51 and the back to which it is secured being thus easily withdrawn or inserted.

The bell crank 83, which operates the center rod and the expanding mechanism connected thereto (see Fig. 2) is pivoted by a cross pin 117, between rearwardly projecting vertical ears 118 of the tree bracket 26. These ears guide and prevent the bell crank from lateral motion, permitting it, however, to swing vertically. The ends of the yoke arms 82 enter and oscillate in recesses 120, cut or formed in the lateral walls of said bearing 18, which adjacent said slot are turned or extended outwardly to form a partial cover or housing 121 for said bell crank and its connections. Said bell crank 83, has an enlarged inner end 122, (Figs. 1, 2, 6, and 7) provided on its upper face with a longitudinal V-shaped recess 123, adapted to be engaged by the similar cam or V-shaped end 124 of a horizontal lever 125, which is pivoted at its rear end by a cross pin 119, between longitudinally vertical walls or ears 127, projecting outwardly from the bearing plate boss 13. These ears guide said lever 125, as it is swung vertically and prevents it from moving or vibrating laterally.

A connecting or treadle rod 128 is connected to said actuating lever, the upper end of said rod being received and pivoted by a cross pin 130, between depending ears 129 of said lever, the lower end of said rod being similarly pivoted at 131 to a treadle 132, which is pivoted to the tree bench at 133, and normally held elevated by means of the coil spring 134. Said treadle rod is shown as made in two parts adjustably connected by means of the swivel or turn buckle 135, to enable its length to be adjusted to elevate or depress the normal position of the treadle and vary the tension of the coil spring 134.

Depression of the treadle acts to pull down the cam or V-shaped end of the actuating lever which is guided by said ears 127, into engagement with the coöperatingly shaped recess in the inner end of the bell crank and moves the latter with it, swinging its upper end inwardly to draw out the expander bar and expand the back or tree as already described. Said tree is held expanded so long as the treadle is held depressed, but I have found it advantageous to provide automatic locking mechanism to hold the tree expanded and to release it at the conclusion of the treeing operations. This automatic docking and releasing mechanism comprises a gravity dog 136, horizontally pivoted between depending ears 137 (Figs. 6 and 7), formed on the outer side of the tree bearing 18. The squared end 138, of a normally vertical arm 139 of said dog, is so positioned relative to the bell crank as to enable it when the latter is depressed, to enter a right angular vertical recess or rabbet 140 (Fig. 6), in the outer wall of the enlarged end of the bell crank and hold the latter down. Upon the automatic locking of the bell crank in its depressed position, the treadle may be released to permit it and the actuating lever to return to their normally elevated position. As shown in Fig. 7, said vertical arm 139 is offset from the pivot of the dog to bring it in alinement with said rabbet or recess 140, thereby preventing the dog from turning on its axis or pivot. When the tree has been expanded by depressing the treadle and is held in locked condition by the gravity dog the boot tree may be swung to one side from the central position in which it was expanded and since the bell crank and gravity dog are both carried by the frame they will remain locked in engagement under the tension of the springs within the tree and will hold the latter expanded until it is again returned to central position. At the conclusion of the treeing or finishing operations, the tree is returned or swung inward to its central position to release the bell crank, the gravity dog or lever holding it down being provided with an upwardly extending arm 141 to be struck by hand to swing the lowered end of the dog outwardly and release the bell crank and expanding mechanism and permit the tree to contract for the removal of its shoe and the application of another when and if desired. To provide for the automatic release of the bell crank, said dog is provided with a lug or intermediate portion immediately below its pivot, having a vertical wall 142, adapted to strike the cam end 124, of the actuating lever as the boot tree is swung into the center, and cause the vertical arm 139 of said dog to swing outwardly from engagement with the bell crank, thereby releasing the latter and the expanding mechanism.

While in the embodiment of my invention herein illustrated a particular type of tree foot is described, I am not limited thereto.

Claims.

1. In a boot and shoe treeing machine, the combination of a support, an expansible tree mounted to swing upon said support, a bell crank lever in operative engagement with the tree for expanding it, a dog pivotally connected with the tree and adapted to engage an arm of said bell crank lever for holding the tree expanded, and a tread lever for automatically tripping the dog from engagement with the bell crank lever as the tree is swung into position.

2. In a boot and shoe treeing machine, the combination of a support, an expansible tree mounted to swing thereon, a bell crank lever movable with the tree and operative to expand the tree, a treadle lever pivotally mounted on the support and adapted to engage the bell crank lever when the tree is in treeing position, a lock acting on the bell crank for holding it in tree expanding position while not in engagement with the treadle lever, said lock having a part to automatically engage the treadle as the tree is swung into treeing position to unlock the bell crank lever.

3. In a boot and shoe treeing machine, an actuating lever, a holding dog, and a bell crank having a head provided with recesses to be engaged by said lever and dog.

4. In a boot and shoe treeing machine, an oscillatory tree frame provided with one or more expansible trees, means to permit said frame to be oscillated to bring a tree into position to be expanded and from such position after expansion, means including a lever provided with a recess for expanding said tree, a gravity dog operating automatically to engage said recess to hold each tree expanded, and means acting automatically to release said dog as the tree is moved into operating position.

5. In a boot and shoe treeing machine, an oscillatory tree frame provided with one or more expansible trees, means to permit said frame to be oscillated to bring a tree into position to be expanded and from such position after expansion, means including a lever and a treadle for operating the said lever for expanding said tree, and a dog operating automatically to engage said lever and hold said tree expanded and to automatically release said lever by return of said tree to expanding position.

In testimony whereof, I have signed my name to this specification, in the presence of two subscribing witnesses.

HENRY H. CUMMINGS.

Witnesses:
SIDNEY F. SMITH,
EUGENE LAVOIS.